United States Patent [19]
Busby

[11] Patent Number: 6,092,823
[45] Date of Patent: *Jul. 25, 2000

[54] BICYCLE FLEXIBLE JOINT

[76] Inventor: James S. Busby, 247 Knox St., Costa Mesa, Calif. 92627

[ * ] Notice: This patent is subject to a terminal disclaimer.

[21] Appl. No.: 08/866,039

[22] Filed: May 30, 1997

Related U.S. Application Data

[63] Continuation-in-part of application No. 08/779,134, Jan. 6, 1997, Pat. No. 5,947,499, which is a continuation-in-part of application No. 08/699,807, Aug. 19, 1996, Pat. No. 5,865,456, which is a continuation-in-part of application No. 08/662,249, Jun. 14, 1996, Pat. No. 5,797,613.

[51] Int. Cl.$^7$ .................................................. B62K 25/28
[52] U.S. Cl. .......................... 280/284; 267/269; 267/270; 280/283; 403/220
[58] Field of Search ..................................... 280/275, 276, 280/281.1, 283, 284, 286, 686; 180/227; 267/246, 270–271, 260, 47, 158, 36.1, 37.1, 269; 403/220, 221, 291, 298, 166; 248/160, 600, 560

[56] References Cited

U.S. PATENT DOCUMENTS

| | | |
|---|---|---|
| 1,377,948 | 5/1921 | Wacker . |
| 2,547,993 | 4/1951 | Benz . |
| 4,771,997 | 9/1988 | Haldenwanger et al. ............... 267/260 |
| 4,869,552 | 9/1989 | Tolleson et al. ......................... 297/296 |
| 5,080,384 | 1/1992 | Groendal et al. ........................ 280/275 |
| 5,445,471 | 8/1995 | Wexler et al. ........................... 403/220 |
| 5,795,613 | 8/1998 | Busby ...................................... 280/284 |
| 5,865,456 | 2/1999 | Busby et al. ............................. 280/284 |

*Primary Examiner*—Anne Marie Boehler
*Attorney, Agent, or Firm*—Stetina Brunda Garred & Brucker

[57] ABSTRACT

A flexible joint for a vehicle frame having at least two (2) frame members. The flexible joint comprises a resilient, flexible member defining a longitudinal axis. Attached to the flexible member is a pair of adaptor members. The adaptor members are attachable to respective ones of the frame members such that the flexible member extends between and interconnects the frame members in a manner wherein the resilient bending of the flexible member along its longitudinal axis facilitates the pivotal movement of one of the frame members relative to the other of the frame members. The flexible member is further adapted to resist torsional movement along its longitudinal axis.

8 Claims, 2 Drawing Sheets

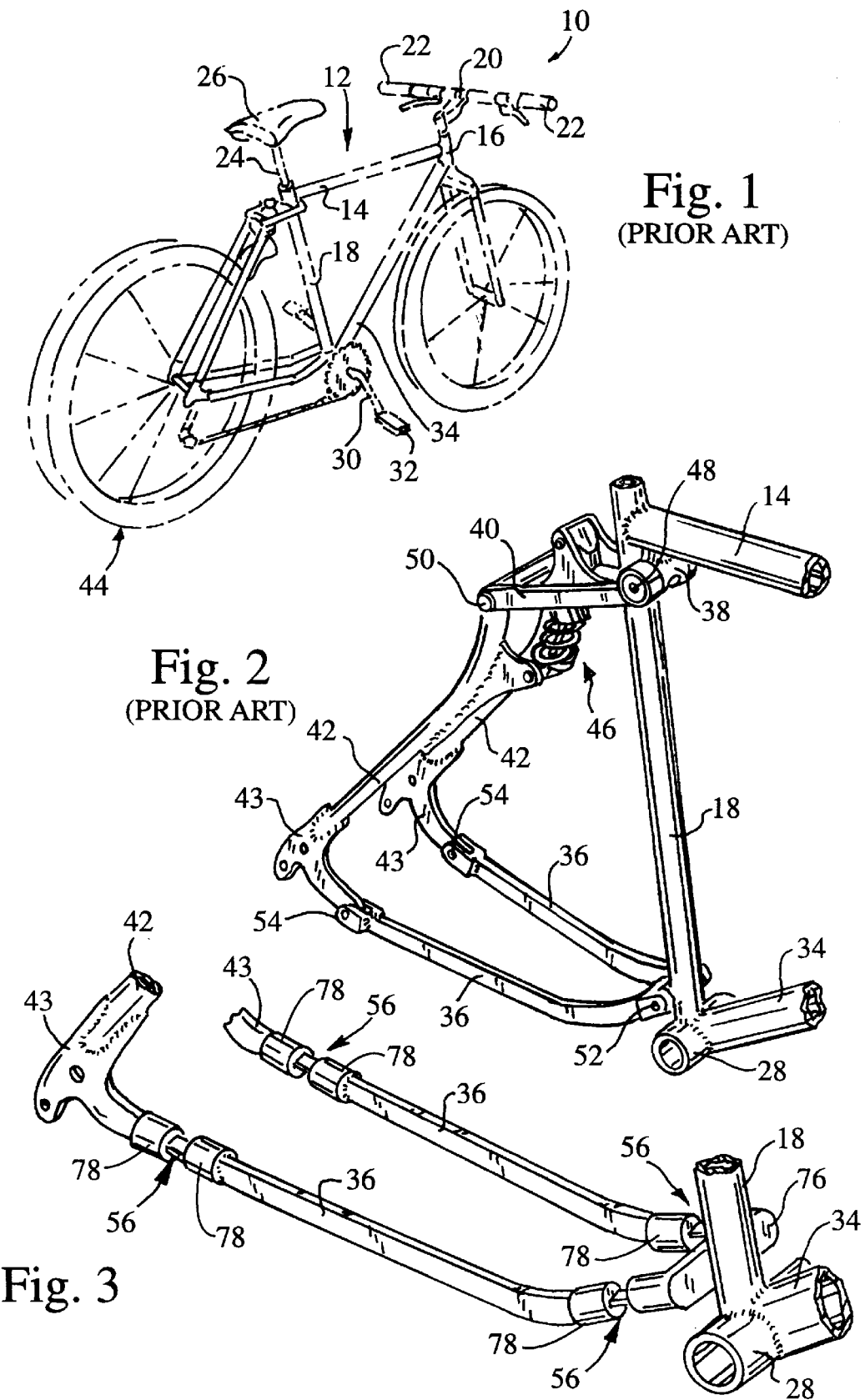

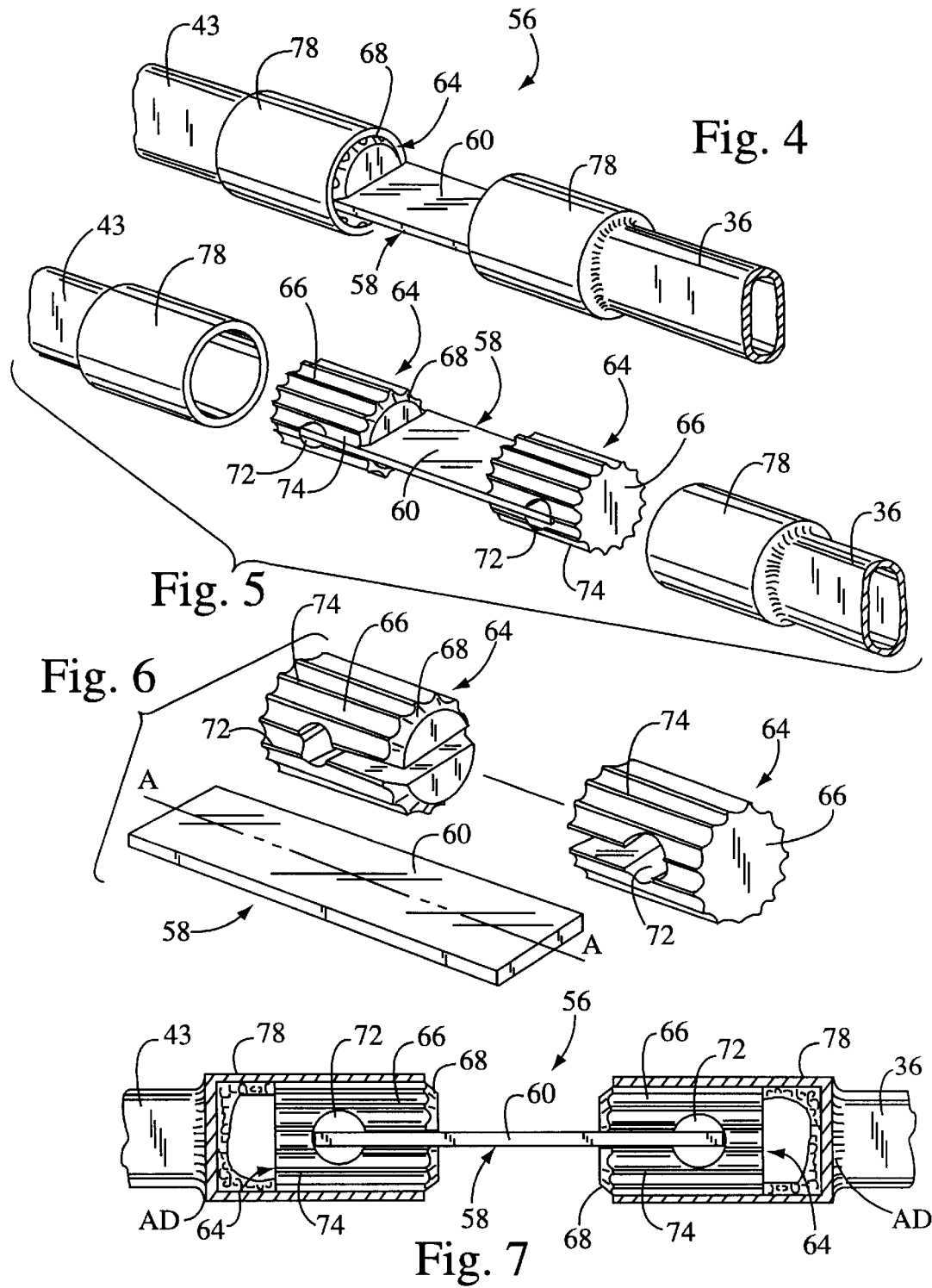

BICYCLE FLEXIBLE JOINT

FIELD OF THE INVENTION

The present application is a continuation-in-part of U.S. application Ser. No. 08/779,134 entitled BICYCLE FLEXIBLE JOINT filed Jan. 6, 1997, now U.S. Pat. No. 5,947,499, which is a continuation-in-part of U.S. application Ser. No. 08/699,807 entitled BICYCLE FLEX JOINT WITH NON-TORSIONAL ENCASEMENT filed Aug. 19, 1996, now U.S. Pat. No. 5,865,456, which is a continuation-in-part of U.S. application Ser. No. 08/662,249 entitled BICYCLE FLEX JOINT filed Jun. 14, 1996, now U.S. Pat. No. 5,797,613. The present invention relates generally to bicycle frame construction, and more particularly to a flexible joint for allowing bicycle frame members to resiliently bend or flex about a particular axis, while mitigating the torsional movement of the frame members relative to each other.

BACKGROUND OF THE INVENTION

The primary structural component of a bicycle is the bicycle frame. Typically, the bicycle frame comprises an elongate top tube which is rigidly secured to and extends between a head tube and a seat tube. The head tube typically provides a structural base for the stem of the bicycle to which the handlebars are attached. The seat tube provides a base for a seat post which is generally telescopically received therewithin and to which is secured the saddle or seat of the bicycle. In typical bicycle frame construction, the seat tube includes a generally cylindrical axle-receiving bracket attached to the bottom end thereof which is adapted to receive a bottom bracket axle. The bottom bracket axle typically extends between and interconnects the cranks to which are attached to the pedals. Rigidly secured to and extending between the head tube and the cylindrical axle-receiving bracket is an elongate down tube.

In addition to the aforementioned structural components, rigidly secured to and extending rearwardly from the axle-receiving bracket are first and second chain stay members. Additionally, rigidly secured to and extending downwardly from the upper end of the seat tube are first and second seat stay members having lower ends which are rigidly secured to the back ends of respective ones of the first and second chain stay members. Typically, the lower ends of the seat stay members and the back ends of the chain stay members are attached to respective ones of a pair of drop-outs which are adapted to receive the rear tire axle of the rear wheel. The head tube, seat tube, top tube, and down tube are typically secured to each other and to the axle-receiving bracket in a manner defining a main front triangle portion of the bicycle frame. The seat stay and chain stay members, when connected to the seat tube, axle-receiving bracket, and drop-outs, typically define a back triangle portion of the bicycle frame.

The foregoing description generally represents the construction of conventional prior art bicycle frames. Typically, when such prior art frames are constructed, the aforementioned structural components are rigidly secured to each other through the use of welding or brazing techniques. Though this method of constructing the bicycle frame provides the resultant frame with structural integrity, the bicycle frame does not possess a suspension having shock absorbing characteristics. As will be recognized, the ride, comfort, and performance of the bicycle would be greatly enhanced if the bicycle frame were adapted to at least partially accommodate the shocks routinely encountered while riding the bicycle.

In recognition of the desirability of accommodating the shocks routinely encountered while riding the bicycle, prior art bicycle frames have been developed which include front and/or rear shock absorbing assemblies. However, such prior art bicycle frames, though having shock absorbing capabilities, possess certain deficiencies which detract from their overall utility. In this respect, such bicycle frames typically include multiple pivot joints, each of which generally comprises a pivot pin which extends through corresponding apertures formed at the ends of frame members of the bicycle frame which are to be pivotally connected to each other.

Though such construction provides for pivotal movement along a desired axis, it necessitates the forming apertures at the ends of the frame members which are to be joined to each other. Each aperture must be machined into a solid member or lug which is typically welded to the tubularly configured frame member. The solid members or lugs are secured to each of the tubular frame members to be joined so as to define a clevis. As will be recognized, such construction methodology inherently requires precision tooling and skilled labor. Thus, pivoting joints formed in accordance with such contemporary methodology are costly and comparatively difficult to fabricate. Such prior art pivoting joints also have an inherent requirement for maintenance such as cleaning and lubrication. These prior art pivoting joints are also susceptible to contamination, particularly since bicycles are commonly used in environments where they are exposed to various environmental contaminants such as dirt, sand, debris, etc.

As such, there exists a need in the prior art for a flexible joint for a bicycle frame which facilitates the resilient bending or flexion of the frame members interconnected thereby about a single desired axis, while mitigating the resilient bending or flexion of such frame members about all other axes, as well as mitigating torsional movement of the interconnected frame members relative to each other. The flexible joint constructed in accordance with the present invention is also adapted to eliminate the need for substantial maintenance, and is inexpensive to manufacture, thus facilitating easy assembly of the bicycle frame.

SUMMARY OF THE INVENTION

In accordance with the present invention, there is provided a flexible joint for a vehicle frame, and more particularly a bicycle frame which includes at least two (2) frame members. The flexible joint of the present invention comprises a resilient, flexible member which defines a longitudinal axis. Attached to the flexible member is a pair of adaptor members. The adaptor members are attachable to respective ones of the frame members such that the flexible member extends between and interconnects the frame members in a manner wherein the resilient bending or flexion of the flexible member along its longitudinal axis facilitates the pivotal movement of one of the frame members relative to the other of the frame members, or the pivotal movement of the frame members relative to each other. The flexible member is further adapted to resist torsional movement along its longitudinal axis. The flexible member is preferably fabricated from a composite material, and more particularly from a fiber (e.g., carbon fiber) reinforced composite material.

The flexible member itself comprises an elongate plate having opposed ends, with the adaptor members being attached to respective ones of the opposed ends of the plate. The plate preferably has a generally rectangular configuration and includes a pair of longitudinal sides or edges and a pair of lateral sides or edges, with the lateral sides of the plates defining respective ones of the opposed ends thereof. As previously indicated, the plate, and hence the flexible member, is preferably fabricated from a composite material, and in particular a fiber reinforced composite material.

In the preferred embodiment, the adaptor members of the flexible joint each comprise a body portion which defines opposed ends. Extending laterally through one end of the body portion is a slot which is sized and configured to receive a respective end portion of the flexible member. The slot of each adaptor member defines an enlarged region which extends laterally through the body portion and has a generally circular cross-sectional configuration. The body portion of each adaptor member preferably has a generally cylindrical configuration, with the slot extending in generally perpendicular relation to the axis thereof. Additionally, the body portion defines an outer surface having a plurality of splines formed thereon and extending longitudinally therealong. Though preferably being cylindrical and having a circular cross-sectional configuration, the body portion may have alternative cross-sectional configurations (e.g., square, triangular, oval, etc.). Each of the adaptor members is preferably fabricated from a metal material, and more particularly aluminum.

BRIEF DESCRIPTION OF THE DRAWINGS

These, as well as other features of the present invention, will become more apparent upon reference to the drawings wherein:

FIG. 1 is a rear perspective view of a bicycle including a bicycle frame which incorporates pivot joints constructed in accordance with the prior art;

FIG. 2 is an enlarged, partial perspective view of a portion of the rear suspension system of the bicycle frame shown in FIG. 1 incorporating pivot joints constructed in accordance with the prior art to facilitate the pivotal movement of various frame members of the bicycle frame relative to each other;

FIG. 3 is a partial perspective view of a bicycle frame incorporating the flexible joints constructed in accordance with the present invention to facilitate the pivotal movement of various frame members of the bicycle frame relative to each other;

FIG. 4 is an enlarged, partial perspective view of the flexible joint of the present invention as used to interconnect adjacent frame members of the bicycle frame to each other;

FIG. 5 is an exploded view of the flexible joint and frame members of the bicycle frame as shown in FIG. 4;

FIG. 6 is an exploded view of the flexible joint constructed in accordance with the present invention; and FIG. 7 is a partial cross-sectional view illustrating the manner in which the flexible joint of the present invention interconnects adjacent frame members of the bicycle frame to each other.

DETAILED DESCRIPTION OF THE PREFERRED EMBODIMENT

Referring now to the drawings wherein the showings are for purposes of illustrating a preferred embodiment of the present invention only, and not for purposes of limiting the same, FIG. 1 perspectively illustrates a bicycle 10 including a bicycle frame 12. The bicycle frame 12 of the bicycle 10 includes a plurality of frame members, and more particularly an elongate top tube 14 which is rigidly secured to and extends between a head tube 16 and a seat tube 18. The head tube 16 typically provides a structural base for the stem 20 of the bicycle 10 to which the handlebars 22 are attached. The seat tube 18 provides a base for a seat post 24 which is telescopically received therewithin and to which is secured the saddle or seat 26 of the bicycle 10. In the bicycle frame 12, the seat tube 18 includes a generally cylindrical axle-receiving bracket 28 attached to the bottom end thereof which is adapted to receive a bottom bracket axle. The bottom bracket axle extends between and interconnects the cranks 30 to which are attached the pedals 32. Rigidly secured to and extending between the head tube 16 and the axle-receiving bracket 28 is an elongate down tube 34.

In addition to the aforementioned frame members, the bicycle frame 12 further comprises a pair of chain stay members 36, the front ends of which are connected to the seat tube 18. Additionally, connected to a link mount 38 rigidly attached to the seat tube 18 and/or top tube 14 is the front end of an upper link 40. Connected to the back end of the upper link 40 are the upper ends of a pair of seat stay members 42, the lower ends of which include respective ones of a pair of drop-outs 43 rigidly secured thereto for accommodating the axle of the rear wheel 44 of the bicycle 10. The drop-outs 43 are also connected to respective ones of the back ends of the chain stay members 36. Connected to and extending between the upper link 40 and seat stay members 42 is a shock absorber 46.

The chain stay members 36, upper link 40, seat stay members 42, drop-outs 43 and shock absorber 46 of the bicycle frame 12 collectively define a shock absorbing rear suspension system of the bicycle 10. In this rear suspension system, the front end of the upper link 40 is pivotally connected to the link mount 38 via a first pivot joint 48, with the upper ends of the seat stay members 42 being pivotally connected to the back end of the upper link 40 via a second pivot joint 50. Additionally, the front ends of the chain stay members 36 are pivotally connected to the seat tube 18 via a third pivot joint 52, with the back ends of the chain stay members 36 being pivotally connected to respective ones of the axle mounting members 43 via fourth pivot joints 54. The rear suspension system of the bicycle 10 functions as described in U.S. Pat. No. 5,441,292, the disclosure of which is incorporated herein by reference.

The pivot joints 48, 50, 52, 54 as shown in FIGS. 1 and 2 are constructed in accordance with prior art techniques and, in the case of the first, second and third pivot joints 48, 50, 52, essentially comprise fasteners such as pivot pins which are extended through coaxially aligned apertures disposed within the corresponding ends of adjacent frame members of the bicycle frame 12. The fourth pivot joints 54 each comprise a clevis arrangement wherein a pivot pin is extended through the coaxially aligned apertures of a pair of clevis mounts attached to corresponding ends of adjacent frame members of the bicycle frame 12. Though the pivot joints 48, 50, 52, 54 facilitate the pivotal movement of certain frame members of the bicycle frame 12 relative to each other, they possess the previously described deficiencies. Thus, in accordance with the present invention, the pivot joints 48, 50, 52, 54 are replaced by a flexible joint 56, the precise structure and function of which will now be described with reference to FIGS. 3–7.

Referring now to FIGS. 3–7, the flexible joint 56 of the present invention for incorporation into the bicycle frame 12 of the bicycle 10 comprises a resilient, flexible member 58 which defines a longitudinal axis A. The flexible member 58 itself comprises an elongate plate 60 which defines opposed ends. The plate 60 preferably has a generally rectangular configuration, and includes a pair of longitudinal sides or edges and a pair of lateral sides or edges, with the lateral sides of the plate 60 defining respective ones of the opposed ends thereof. In the preferred embodiment, the flexible member 58 (i.e., the plate 60) is fabricated from a composite material, and preferably a fiber reinforced composite material. The composite material may be reinforced by carbon fibers, or alternatively from fibers fabricated from differing materials (e.g., nylon, polyester).

The fabrication of the flexible member 58 from the composite material provides the same with both a desired level of flexibility and resistance to torsional movement. The degree of flexion which the flexible member 58, and hence the flexible joint 56, is capable of achieving may be regulated by selectively increasing or decreasing the thickness of the flexible member 58. As will be recognized, increasing the thickness of the flexible member 58 effectively reduces the resiliency/flexibility thereof, with a decrease in the thickness facilitating a resultant increase in the resiliency/flexibility of the flexible member 58. Those of ordinary skill in the art will recognize that the flexible member 58 may be fabricated to have a shape or structure other than for the preferred rectangularly configured plate 60, provided that any such alternative shape/structure possesses the desired level of resiliency/flexibility and resistance to torsional movement. Additionally, the flexible member 58 may be fabricated from a resilient material other than a composite (e.g., spring steel) depending on the desired functional attributes of the flexible joint 56.

In addition to the flexible member 58, the flexible joint 56 comprises an identically configured pair of adaptor members 64 which are attached to respective ones of the opposed end portions of the flexible member 58 (i.e., plate 60). The adaptor members 64 each comprise a cylindrically configured body portion 66 defining opposed ends. Extending laterally through one end of the body portion 66 is a slot 72 which is sized and configured to receive a respective one of the opposed end portions of the flexible member 58 in a manner which will be described in more detail below. The peripheral edge 68 of the end of the body portion 66 having the slot 72 disposed therein preferably has a chamfered or beveled configuration.

As further seen in FIGS. 6 and 7, the slot 72 of each adaptor member 64 comprises a narrow region which extends from the end of the body portion 66 including the chamfered peripheral edge 68 and terminates into an enlarged region having a generally circular cross-sectional configuration. The axis of the circularly configured enlarged region of the slot 72 extends in generally perpendicular relation to the axis of the body portion 66. The opposed walls of the narrow region of each slot 72 are generally planar.

The attachment of the flexible member 58 to the adaptor members 64 is facilitated by the advancement of the opposed end portions of the plate 60 into respective ones of the slots 72. Such advancement is limited by the abutment of the lateral sides or edges of the plate 60 against respective ones of the arcuately contoured inner walls of the body portions 66 which define the enlarged regions of the slots 72. In the preferred embodiment, the lateral sides of the plate 60 are adhesively secured to the arcuate inner walls of the body portions 66 defining the slots 72, with those portions of the plate 60 extending through the narrow regions of the slots 72 being adhesively secured to the opposed walls thereof. As such, the plate 60, and hence the flexible member 58, is adhesively secured to the adaptor members 64. The width of the narrow region of each slot 72 is preferably slightly less than the thickness of the plate 60. In this respect, the inclusion of the enlarged regions in the slots 72 allows the juxtaposed sections of the body portions 66 defined by the narrow regions of the slots 72 to be flexed slightly away from each other to facilitate the insertion of the opposed end portions of the plate 60 into the slots 72. As such, the juxtaposed sections of the body portion 66 of each adaptor member 64 exert a biasing force against the plate 60, in addition to the opposed walls defining each narrow region of the slot 72 being adhesively secured to a respective end portion of the plate 60. The flexible joint 56 defined by the attachment of the adaptor members 64 to the flexible member 58, and more particularly the plate 60, in the aforementioned manner is best shown in FIG. 5.

The body portion 66 of each adaptor member 64 further comprises a plurality of splines 74 which are formed on and extend longitudinally along the outer surface thereof in equidistantly spaced relation to each other. As seen in FIG. 5, the lateral width of the plate 60 is such that when the opposed end portions of the flexible member 58 are inserted into the slots 72 in the aforementioned manner, the longitudinal sides of the plate 60 do not extend laterally beyond the outermost edges of the splines 74. The splines 74 are used to aid in securing the flexible joint 56 to the bicycle frame 12 in a manner which will also be described in more detail below.

The adaptor members 64 are each preferably fabricated from a metal material, and more particularly aluminum, though other materials may also be employed for the adaptor members 64 in the flexible joint 56. Additionally, though the body portions 66 of the adaptor members 64 are preferably cylindrically configured (i.e., have circular cross-sectional configurations), those of ordinary skill in the art will recognize that the body portions 66 may be formed to have alternative cross-sectional configurations (e.g., square, triangular, oval, etc.). The use of aluminum for the adaptor members 64 and a composite material for the flexible member 58 provides the flexible joint 56 of the present invention with an extremely light weight construction.

In FIGS. 3–5 and 7, the flexible joints 56 constructed in accordance with the present invention are shown as being used to facilitate the attachment of the front ends of the chain stay members 36 to a mounting bracket 76 which is itself rigidly attached to the seat tube 18, and the back ends of the chain stay members 36 to respective ones of the drop-outs 43. More particularly, in the bicycle frame 12 incorporating the flexible joints 56, the back ends of the chain stay members 36 each include a hollow, cylindrically configured connector sleeve 78 rigidly attached thereto via a welded or brazed connection. Connector sleeves 78 are also rigidly attached to the front ends of respective ones of the drop-outs 43 via welded or brazed connections. Subsequent to the attachment of the flexible member 58 to the adaptor members 64 in the aforementioned manner, the extension of a pair of flexible joints 56 between the chain stay members 36 and the drop-outs 43 is facilitated by inserting the adaptor members 64 of each flexible joint 56 into respective ones of an opposed, corresponding pair of connector sleeves 78 attached to the chain stay members 36 and drop-outs 43. As best seen in FIGS. 4 and 7, the advancement of each adaptor member 64 into a respective connector sleeve 78 is continued until such time as the peripheral edge 68 of the adaptor member 64 is substantially flush with the distal rim of the connector sleeve 78.

In the flexible joint 56 of the present invention, the inner diameter of each connector sleeve 78 only slightly exceeds the maximum diameter of the adaptor member 64 as defined by the outer surfaces of the splines 74 disposed on the body portion 66 thereof. In this respect, the body portion 66 of the adaptor member 64 including the spline 74 thereon is adapted to be slidably inserted into a respective connector sleeve 78. As seen in FIG. 7, prior to such insertion an adhesive AD or similar bonding agent is applied to the outer surface of the body portion 66 between the splines 74. Subsequent to the insertion of the body portion 66 including the adhesive AD applied thereto into the connector sleeve 78, the curing/hardening of the adhesive facilitates the rigid attachment of the adaptor member 64 to the sleeve 78, and hence a frame member of the bicycle frame 12.

When the adaptor members 64 are attached to corresponding pairs of the connector sleeves 78 of the chain stay members 36 and drop-outs 43 in the aforementioned manner, the flexible members 58 extends between and interconnect the chain stay members 36 and drop-outs 43 in a manner wherein the resilient bending or flexion of the flexible members 58 along their longitudinal axes A facilitates the pivotal movement of one pair of the interconnected frame members relative to the other pair, or the pivotal movement of the interconnected frame members relative to each other. Advantageously, though being adapted to resiliently bend along its longitudinal axis A, each flexible member 58 is adapted to resist torsional movement along its longitudinal axis A.

As further seen in FIG. 3, connector sleeves 78 are also rigidly attached to the front ends of respective ones of the chain stay members 36, and to the opposed ends of the mounting bracket 76. In this respect, the interconnection of the front ends of the chain stay members 36 to the mounting bracket 76 through the use of the flexible joints 56 is accomplished in the same manner as previously described in relation to the interconnection of the back ends of the chain stay members 36 to the drop-outs 43. Though not shown, those of ordinary skill in the art will recognize that the flexible joints 56 constructed in accordance with the present invention may also be integrated into other portions of the bicycle frame 12 as an alternative to a conventional, prior art pivot joint. For example, flexible joints 56 may be substituted for the first pivot joint 48 and second pivot joint 50, in addition to the third and fourth pivot joints 52, 54 as previously described. Additionally, the flexible joints 56 constructed in accordance with the present invention may be incorporated into the frames of other types of bicycles, as well as the frames of vehicles other than for bicycles (e.g., motorcycles). Further, different structures or methods may be employed to facilitate the attachment of the flexible joints 56 to the bicycle or other vehicle frame as an alternative to the use of the connector sleeves 78. For example, the frame members may be formed from composite materials which are laminated or bonded directly to the adaptor members 64 to integrally connect the flexible joints 56 to the frame. Additionally, the adaptor members 64 may be advanced into and secured within tubular frame members having generally circular cross-sectional configurations.

The flexible joint 56 of the present invention provides a less costly and easier to assemble replacement for contemporary pivot joints. It also provides an excellent means for mitigating undesirable bending and/or torsion of one frame member of the bicycle frame 12 relative to another frame member, while simultaneously facilitating bending of the frame members along a desired axis relative to each other. The flexible joint 56 of the present invention requires less maintenance than contemporary pivot joints which incorporate pivot pins in that it does not require periodic lubrication and is not susceptible to environmental contamination. The present flexible joint 56 is also rugged enough to withstand the substantial forces applied to the bicycle frame 12 during pedalling and riding, particularly in the conditions frequently encountered in all terrain and/or mountain riding.

Additional modifications and improvements of the present invention may also be apparent to those skilled in the art. Thus, the particular combination of parts described and illustrated herein is intended to represent only one embodiment of the present invention, and is not intended to serve as limitations of alternative devices within the spirit and scope of the invention.

What is claimed is:

1. A flexible joint for a vehicle frame having at least two frame members, the flexible joint comprising:

a flexible member configured as a generally rectangular plate and constructed from a resilient material, the flexible member defining a longitudinal axis and having a pair of longitudinal sides and a pair of lateral sides which define opposed ends;

a pair of adaptor members attached to respective ones of the opposed ends of the flexible member, each of the adaptor members comprising:

a body portion defining a body axis and having opposed ends, the body portion further including a pair of juxtaposed sections which each define a generally planar wall;

a slot extending laterally through one of the ends of the body portion and including a narrow region which transitions into an enlarged region, the narrow region of the slot being defined by the walls of the juxtaposed sections of the body portion thereof, the enlarged region of the slot having a generally circular configuration defined by an arcuate inner wall of the body portion, the enlarged region of the slot further defining an axis which extends in generally perpendicular relation to the body axis of the body portion, the enlarged portion of the slot being sized to allow for the flexion of the juxtaposed sections of the body portion away from each other;

the adaptor members being attached to the flexible member such that the opposed ends of the flexible member reside within respective ones of the enlarged regions of the slots and the body axes of the body portions are substantially aligned with the longitudinal axis of the flexible member, the adaptor members being attachable to respective ones of the frame members such that the flexible member extends between and interconnects the frame members in a manner wherein the resilient bending of the flexible member along the longitudinal axis facilitates pivotal movement of one of the frame members relative to the other of the frame members, the flexible member being adapted to resist torsional movement along the longitudinal axis, and the flexible member being sized relative to the slot of each of the adaptor members such that the juxtaposed sections thereof must be flexed away from each other to facilitate the incision of the flexible member into the slot.

2. The flexible joint of claim 1 wherein:

the body portion of each of the adaptor members has an outer surface including a plurality of splines formed thereon and extending longitudinally therealong, each of the splines defining an outer edge; and the plate is sized relative to the adaptor members such that the longitudinal sides of the plate do not protrude beyond the outer edges of the splines.

3. The flexible joint of claim 1 wherein:

the opposed ends of the plate are secured to respective ones of the arcuate inner walls through the use of an adhesive; and portions of the plate adjacent the opposed ends thereof are secured to the walls of respective pairs of the juxtaposed sections through the use of an adhesive.

4. The flexible joint of claim 1 wherein the flexible member is fabricated from a composite material.

5. The flexible joint of claim 4 wherein the flexible member is fabricated from a fiber reinforced composite material.

6. The flexible joint of claim 1 wherein the body portion of each of the adaptor members has a generally cylindrical configuration.

7. The flexible joint of claim 1 wherein the adaptor members are each fabricated from a metal material.

8. The flexible joint of claim 7 wherein the adaptor members are each fabricated from aluminum.

* * * * *